United States Patent [19]

Bissonnette

[11] Patent Number: 4,957,310
[45] Date of Patent: Sep. 18, 1990

[54] DETACHABLE SKI OR TERRAIN MAP

[76] Inventor: Michael R. Bissonnette, P.O. Box 196, Terryville, Conn. 06786

[21] Appl. No.: 439,558

[22] Filed: Nov. 20, 1989

[51] Int. Cl.⁵ .............................................. G09B 29/00
[52] U.S. Cl. ........................................ 283/34; 283/35
[58] Field of Search ..................... 2/DIG. 6, 206, 207, 2/208, 59, 16; 283/34, 35, 117, 2, 3, 4; 281/51; 40/586

[56] References Cited

U.S. PATENT DOCUMENTS

| | | | |
|---|---|---|---|
| 1,596,118 | 8/1926 | Plume | 283/35 |
| 2,058,040 | 10/1936 | Severn | 2/59 |
| 2,647,261 | 8/1953 | Rassner. | |
| 2,983,272 | 5/1961 | Hunstinger | 128/149 |
| 3,214,852 | 11/1965 | Ford et al. | |
| 4,287,609 | 9/1981 | Amadeo | 2/16 |
| 4,375,133 | 3/1983 | Fenrich et al. | |
| 4,415,106 | 11/1983 | Connell et al. | |

OTHER PUBLICATIONS

Killington Ski Trail Guide Book, 1985–1986.

*Primary Examiner*—Frank T. Yost
*Assistant Examiner*—Thomas Hamill, Jr.
*Attorney, Agent, or Firm*—Chilton, Alix & Van Kirk

[57] ABSTRACT

A ski or terrain map for detachable wearing on the arm, comprising flexible, folded band having opposed longitudinal end portions and having ski trails or other indicia of topography or terrain depicted thereon. Attachment means are carried by the band for detachably securing one longitudinal end portion of the band to the other longitudinal end portion of the band, such that the map firmly encircles the user's arm. The attachment means are contained within the perimeter of the map substrate, and, in a preferred embodiment, a loop or other means are provided for holding one end of the substrate substantially in contact with the user's arm as the substrate is circled about the arm. Preferably, Velcro or a similar strip having a multiplicity of interengageable fibers is used as the attachment means.

14 Claims, 3 Drawing Sheets

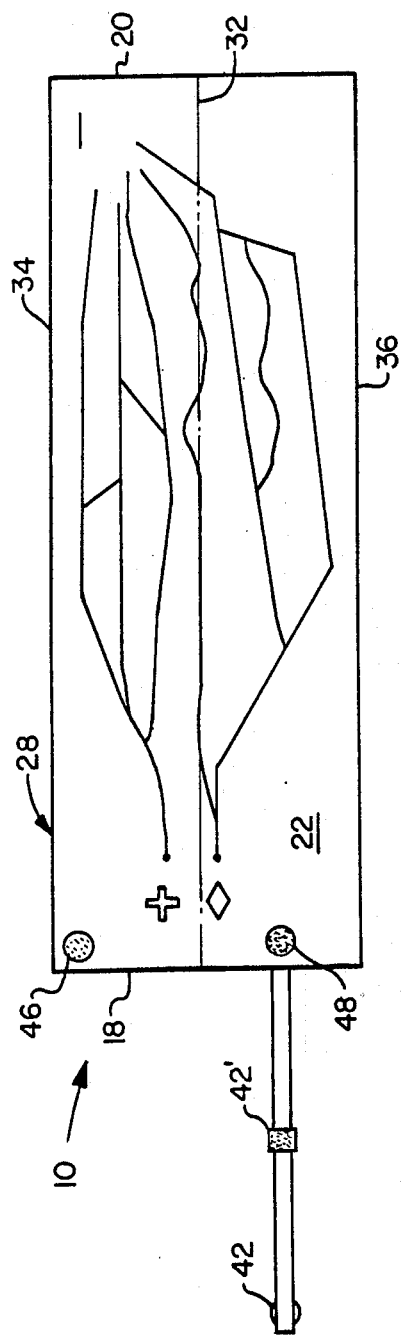
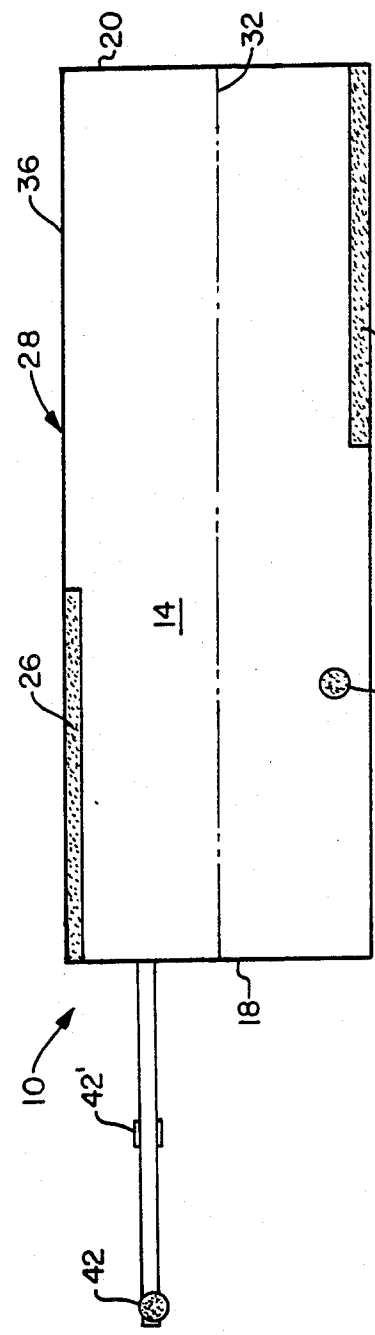

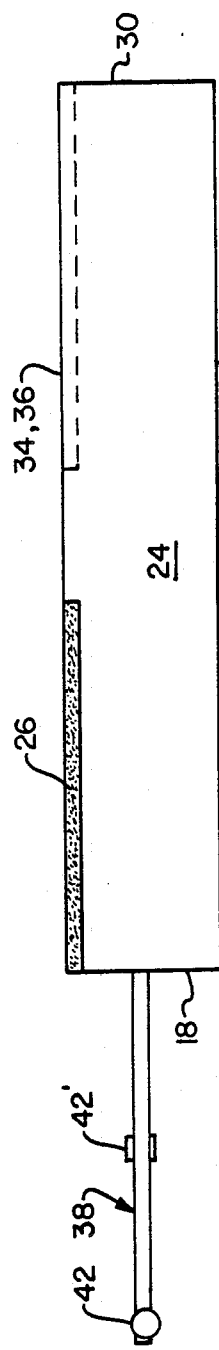
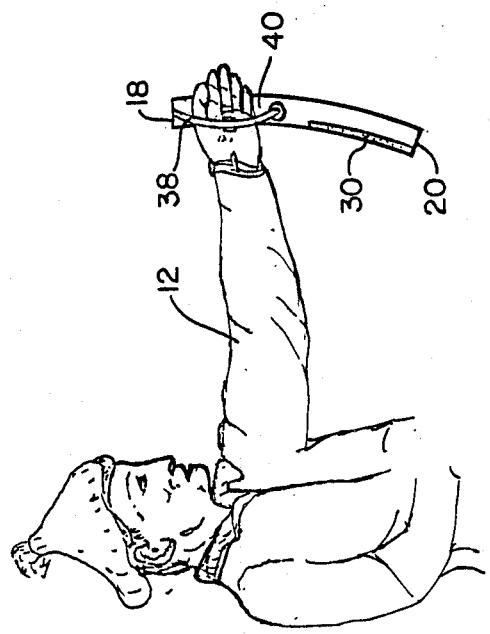
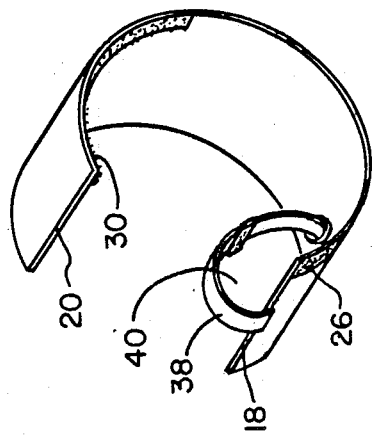
Fig. 4
Fig. 6
Fig. 5

DETACHABLE SKI OR TERRAIN MAP

BACKGROUND OF THE INVENTION

The present invention relates to maps or other two-dimensional direction guides, and more particularly, to a map that can be detachably worn over a heavy outer garment such as a ski jacket.

A common problem among even experienced skiers, is unfamiliarity with all the trails of a ski resort not frequently visited, and the resulting need to either memorize or consult while on the slope, a map identifying each trail and its various branches and intersections. Although ski facilities typically provide such maps at no charge or at a nominal price, skiers encounter a major inconvenience when they approach a fork in the trail, stop and remove their gloves, pull a folded map out from a pocket, read the map, fold up the map, insert it in the pocket, and then put on their gloves before continuing down the slope. Manipulating a standard map while wearing ski gloves is virtually impossible, but removal of the gloves for even brief periods of time produces significant discomfort and possible danger to the skier due to exposure of the skin.

U.S. Pat. No. 4,415,106 issued Nov. 15, 1983 for a Map Holder, attempts to overcome this problem by providing a map holder having a printed surface on a thin flexible substrate, or within a transparent sleeve, which is attached to a skier's limb and provides a view of the map without the need for the skier to remove gloves. The map holder of the '106 patent suffers several disadvantages. First, the size of the map which may be visible by the user upon lifting the arm and looking at the biceps area, is quite limited—on the order of ten or twelve square inches. For large ski areas, the information desired by most skiers simply cannot be legibly placed on such a small map area, particularly if the skier wishes to view the map through goggles or the like. Although certain major trails may be shown in this manner, the branches at intersections, along with indicia indicating the degree of difficulty, cannot easily be shown.

Secondly, the information content of the map is on the exterior of the substrate and, whether or not covered by a sleeve, is subject to the accumulation of ice, dirt, freezing rain, and other elements which could easily cover all or portions of the map and prevent the skier from learning important information such as the branching or intersection of a particular trail.

A further disadvantage of the map holder of the '106 patent is the relative permanence of the attachment to the user's arm or other body part. The overlapping of the projecting straps so that the interlocking of the attachment means can be accomplished, requires delicate manipulation and is virtually impossible to accomplish while wearing gloves. Thus, the skier would attach the map holder while in the lodge and not be able to remove or replace it, nor replace the map with a map of another ski slope, for example, without returning to the lodge or removing the gloves with the consequent exposure of the bare hands to the elements.

SUMMARY OF THE INVENTION

It is the object of the present invention to provide a ski map or similar terrain map, which includes a relatively large map display area which is protected from the elements in use, and which can easily be secured to and detached from the arm of the user as the need arises, while the user wears bulky gloves.

In general, the invention is directed to a ski or terrain map for detachable wearing on the arm, comprising an elongated, flexible band having opposed longitudinal end portions and having ski trails or other indicia of topography or terrain depicted thereon. Attachment means are carried by the band for detachably securing one longitudinal end portion of the band to the other longitudinal end portion of the band, such that the map firmly encircles the user's arm.

More specifically, the map in accordance with the invention comprises a flexible, substantially flat, folded substrate having first and second longitudinal ends and inner and outer surfaces, the inner surface having a map or similar information depicted thereon. A first attachment means is secured to the outer surface adjacent the first end of the substrate, and a second attachment means is secured to the outer surface adjacent the second end of the substrate for engagement with the first attachment means. The substrate and attachment means are arranged so that, whether or not folded, the substantially flat substrate can be circled back on itself, band-like, while being wrapped around a generally cylindrical central body such as the user's arm, so that the first and second attachment means can be joined to secure the terrain map to the central body.

Generally, the attachment means are contained within the perimeter of the map substrate, and, in a preferred embodiment, a loop or other means are provided for holding one end of the substrate substantially in contact with the user's arm as the substrate is circled about the arm. Preferably, Velcro or a similar strip having a multiplicity of interengageable fibers is used as the attachment means.

BRIEF DESCRIPTION OF THE DRAWINGS

FIG. 2 is a plan view of the inner substrate surface of the preferred embodiment, showing the map information detailed thereon;

FIG. 3 is a plan view of the preferred embodiment of the invention, showing the substrate outer surface and associated attachment means;

FIG. 4 is a plan view of the map in accordance with the invention, showing the first step of folding the substrate into a band prior to wrapping the map around the user's arm;

FIG. 5 is a perspective view of the map with preferred loop during wrapping;

FIG. 6 is an illustration showing the invention during an intermediate step before being wrapped around the user's arm.

DESCRIPTION OF THE PREFERRED EMBODIMENT

Figure 1:
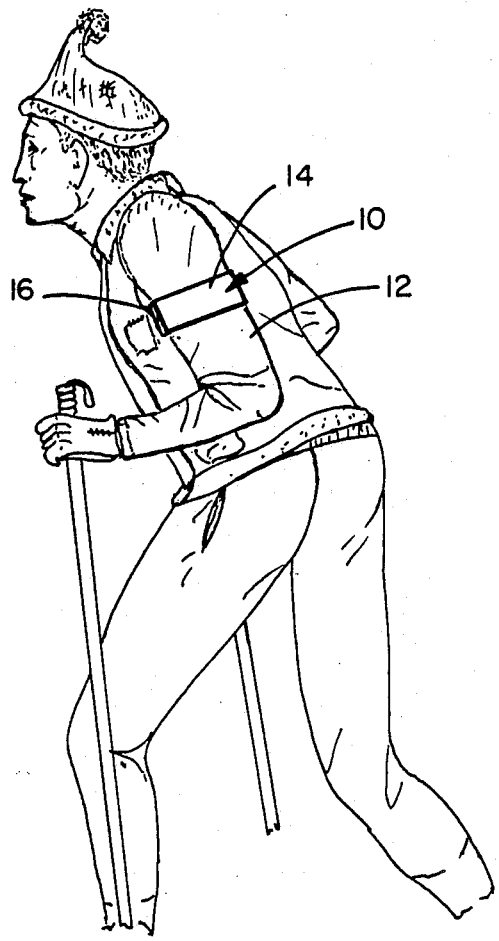
FIG. 1 is an illustration of the invention in use on a skier's arm.

FIGS. 1-3 show the terrain or ski map 10 in accordance with the present invention, secured to the arm 12 of a skier or other outdoor sportsman who encounters inclement weather while following a trail or the like. In the form shown in FIG. 1, the map comprises an elongated, flexible band having an inner surface not visible in FIG. 1 on which is displayed the information useful to the skier, and an outer surface 14 exposed to the elements. The band encircles the arm and has one end wrapped around the other end, preferably with sufficient overhang such as indicated at 16, whereby the user may grasp the overhang and unwrap the substrate from the arm.

The preferred map 10 is shown in FIGS. 2 and 3, as a rectangular, flexible, substantially planar substrate structure 28 having first and second longitudinal ends 18,20, the inner surface 22 thereof being visible in FIG. 2 and the outer surface 14 thereof being visible in FIG. 3. A first attachment means 26, such as an elongated Velcro strip, is secured to the outer surface within the perimeter of the substrate 28, and extending from a location substantially adjacent the first end 18 of the substrate toward the second end 20 of the substrate. Similarly, a second attachment means 30 such as a mating Velcro strip, is secured to the outer surface 14 within the substrate perimeter at a location adjacent the second end 20 of the substrate and extending toward the first end 18.

In the illustrated embodiment, the substrate includes a centrally located, longitudinally extending fold line 32 whereby the substrate may be folded once with the map or inner side 22 folded onto itself, and the outer surface 14 remaining on the exterior of the folded substrate as shown in FIG. 4. Prior to folding, the substrate has opposed, parallel first and second longitudinal edges 34,36. After folding of the substrate, the resulting band has co-extensive first and second longitudinal edges 34,36 which effectively form one longitudinal edge, while the longitudinal fold line 32 forms another effective edge.

In this embodiment, the attachment strips 26,30 extend parallel to and adjacent the first longitudinal edge 34 and the second longitudinal edge 36, respectively, such that when the substrate 28 is folded as shown, the first attachment means 26 and the second attachment means 30 are aligned in substantially a straight line, along the first and second substrate edges 34,36 which are now opposite the fold line 32. It can thus be appreciated that if the first end 18 of the band is retained in a stationary position and the second end 20 is wrapped around a central body such as a user's arm so as to encircle the arm, the second attachment means 30 can be placed over and pressed down on the first attachment means 26, thereby firmly securing the map to the user's arm.

Depending on the complexity of the topography to be depicted on the map, and the circumference or length of the body portion to which the map will be attached, e.g., a biceps or a thigh, for example, the substrate 28 could have no fold lines and be adapted to wrap around itself end to end, in which case the first and second attachment means would be provided along opposite ends 18,20, or attachment means could be provided along the first and second edges adjacent both the first and second ends 18,20 of the substrate. In another embodiment, the substrate could be folded longitudinally two times, i.e., along three fold lines intermediate the longitudinal edges 34,36, in which case the attachment means would be provided along either side of one fold line, or along one fold line and one edge, or other such arrangement such that when the substrate is wrapped end to end, the attachment means, particularly in the form of strips within the perimeter of the substrate, align and then overlap each other.

The preferred form of each attachment means is an elongated Velcro strip 26,30 or similar material having interengageable fibers. The strips 26,30 are secured over their full length to the substrate 28 and typically have a length of nearly one-half the length of the substrate 28 to permit securement in any one of a plurality of overlapping relations of the substrate ends 18,20. The attachment means need not be in the form of continuous strips, nor abut the edges of the substrate, so long as the attachment means provides adjustability of the longitudinal dimension of the band.

The preferred substrate material is a thin, water resistant, yet sturdy material such as is available from the DuPont Company under the trademark Tyvek, which is printable on at least one side.

As shown in FIGS. 4-6, means connected to one end 18 of the substrate 28, such as a loop forming strap 38 or the like, enable the user to slip the arm 12 through the loop 40 and thus hold or retain one end 18 of the band substantially in contact with the arm or central body as the band is circled about the body to secure one end to the other. One end of the loop strap 38 may be permanently attached to one end of the substrate and the other end attachable, as by one or more Velcro tabs 42,42' to a mating tab 44 on the outer surface 14 of the substrate (See FIG. 3). Furthermore, Velcro tabs 46,48 or the like can be provided on the inside surface 22 (FIG. 2) at the end 18 of the substrate near the strap 38, so that when the substrate is folded over along the fold line 32 to form a band, the longitudinal edges 34,36 remain together and are not subjected to unweildly bending while the band is manipulated. In this way, the narrow, elongated shape of the band is retained while the user wraps the band around the arm.

It may thus be appreciated that after the substrate 28 is folded once as shown in FIG. 4, and the arm passed through the loop as shown in FIG. 6, the user can readily wrap the band in the manner shown in FIG. 5, preferably leaving some overhang 16 between the overlapped and the underlying portion of the band. This permits easy pulling of the overhang to disengage the attachment means 26,30, and either the pulling of the arm out through the loop 40 or the disengagement of the strap 38. The user then unfolds the band to expose the inner surface 22 on which the terrain is depicted, makes a decision as to the path to follow, folds the substrate 28 and either reestablishes the loop 40 before inserting the arm through or places the map 10 near the arm and engages the tab on the strap, preparatory to wrapping the band around the arm for securement therewith.

It should be appreciated that the invention as described herein is well adapted to perform the objects set forth above, and is an improvement over known devices and techniques for providing ski maps carried by the outer garments of skiers or the like.

I claim:
1. A terrain map comprising:
a flexible, substantially flat substrate having inner and outer surfaces, the inner surface having a terrain map depicted thereon, the substrate being foldable into a band having first and second longitudinal ends;
first attachment means carried by one surface adjacent the first end of the band;
second attachment means carried by said one surface adjacent the second end of the band and detachably engageable with the first attachment means;
whereby as one end of the band is circled back to overlap with the other end while being wrapped around a generally cylindrical central body, the first and second attachment means can be joined to secure the terrain map to the central body.

2. The terrain map of claim 1, wherein,
the substrate has opposed longitudinally extending edges and is foldable along at least one longitudinal fold line intermediate the edges, and
the first attachment means is carried by the outer surface adjacent one of the edges or fold lines, and the second attachment means is carried by the outer surface adjacent another one of the edges or fold lines.

3. The terrain map of claim 2 wherein
the substrate has one fold line, and
the first and second attachment means are each carried by the outer surface adjacent one of the edges.

4. The terrain map of claim 2, wherein
the substrate has two fold lines, and
the first attachment means is carried by the outer surface adjacent one of the edges and the second attachment means is carried by the outer surface adjacent a fold line.

5. The terrain map of claim 1, wherein the first and second attachment means are each in the form of an elongated strip contained within the perimeter of the substrate, whereby the first and second attachment means are engageable to each other in any one of a plurality of overlapping relations.

6. The terrain map of claim 5, wherein the attachment means each includes a multiplicity of interengageable fibers.

7. The terrain map of claim 1, including means connected to one end of the substrate, for holding said one end substantially in contact with the central body as the band is circled about the body.

8. The terrain map of claim 7, wherein the means for holding includes a looped strap.

9. The terrain map of claim 2, including means carried by the inside surface adjacent to one end of the band, for connecting the substrate folds together.

10. A ski map for detachable wearing on the arm, comprising:
an elongated, flexible substrate having front and back surfaces and opposed longitudinal end portions within the substrate perimeter, one surface having ski trail information carried thereon over substantially all of said one surface;
means carried by the substrate for detachably securing the substrate to itself when one longitudinal end portion is wrapped around the other longitudinal end portion to firmly encircle the skier's arm.

11. The ski map of claim 10, wherein the substrate has an inner surface on which the ski trails are depicted and an outer surface on which the means for securing are carried.

12. The ski map of claim 11, wherein the substrate has at least one longitudinal fold line and the folded substrate is sized to encircle a skier's arm.

13. The ski map of claim 12, wherein the outer surface is exterior to the inner surface when the substrate is folded along the fold line.

14. The ski map of claim 10, wherein the means for securing are in the form of longitudinally oriented strips.

* * * * *